US00RE40194E

(19) United States
(12) Reissued Patent
Slattery

(10) Patent Number: US RE40,194 E
(45) Date of Reissued Patent: Apr. 1, 2008

(54) TUFTING MACHINE YARN FEED PATTERN CONTROL

(75) Inventor: Ian Slattery, Hixson, TN (US)

(73) Assignee: Spencer Wright Industries, Inc., Dalton, GA (US)

(21) Appl. No.: 10/336,406

(22) Filed: Jan. 2, 2003

Related U.S. Patent Documents

Reissue of:
(64) Patent No.: 6,213,036
Issued: Apr. 10, 2001
Appl. No.: 09/536,269
Filed: Mar. 27, 2000

(51) Int. Cl.
*D05C 15/18* (2006.01)
*D05C 15/04* (2006.01)

(52) U.S. Cl. ..... 112/80.3

(58) Field of Classification Search ..... 112/80.01, 112/80.18, 80.23, 80.7, 80.71–80.73, 302, 112/254, 255
See application file for complete search history.

(56) References Cited

U.S. PATENT DOCUMENTS 3,203,379 A * 8/1965 Dedmon et al. ..... 112/80.52
3,203,387 A * 8/1965 Fedevich ..... 112/302
3,221,683 A * 12/1965 Abelsma ..... 112/80.7 X
3,847,098 A * 11/1974 Hammel, Jr. ..... 112/80.73
3,955,514 A * 5/1976 Prichard et al. ..... 112/80.73
4,078,505 A * 3/1978 Fitton et al. ..... 112/80.7
5,042,405 A * 8/1991 Bradley et al. ..... 112/80.7
5,182,997 A * 2/1993 Bardsley ..... 112/80.73
5,383,415 A * 1/1995 Padgett, III ..... 112/80.73 X
5,806,446 A * 9/1998 Morrison et al. ..... 112/80.73
5,983,815 A * 11/1999 Card ..... 112/80.73
6,283,053 B1 * 9/2001 Morgante et al. ..... 112/80.73

* cited by examiner

*Primary Examiner*—Ismael Izaguirre
(74) *Attorney, Agent, or Firm*—Alan Ruderman; Stephen J. Stark

(57) ABSTRACT

A tufting machine has a yarn feed pattern assembly including a housing having a mounting plate for mounting a multiplicity of yarn feed rollers from the exterior of said mounting plate and a multiplicity of servo motors connected to said mounting plate on the interior of said housing. Each servo motor is connected to a respective feed roller. A multiplicity of tubes extend within said housing, half the tubes directing yarn from a source to respective rollers and half of the tubes directing yarn from the rollers to respective needles. The guide tubes direct yarn from the interior of said housing through said mounting plate where the yarn is trained about a respective roller and directed back into the yarn guide leading toward the needles of said tufting machine.

7 Claims, 2 Drawing Sheets

FIG. 2
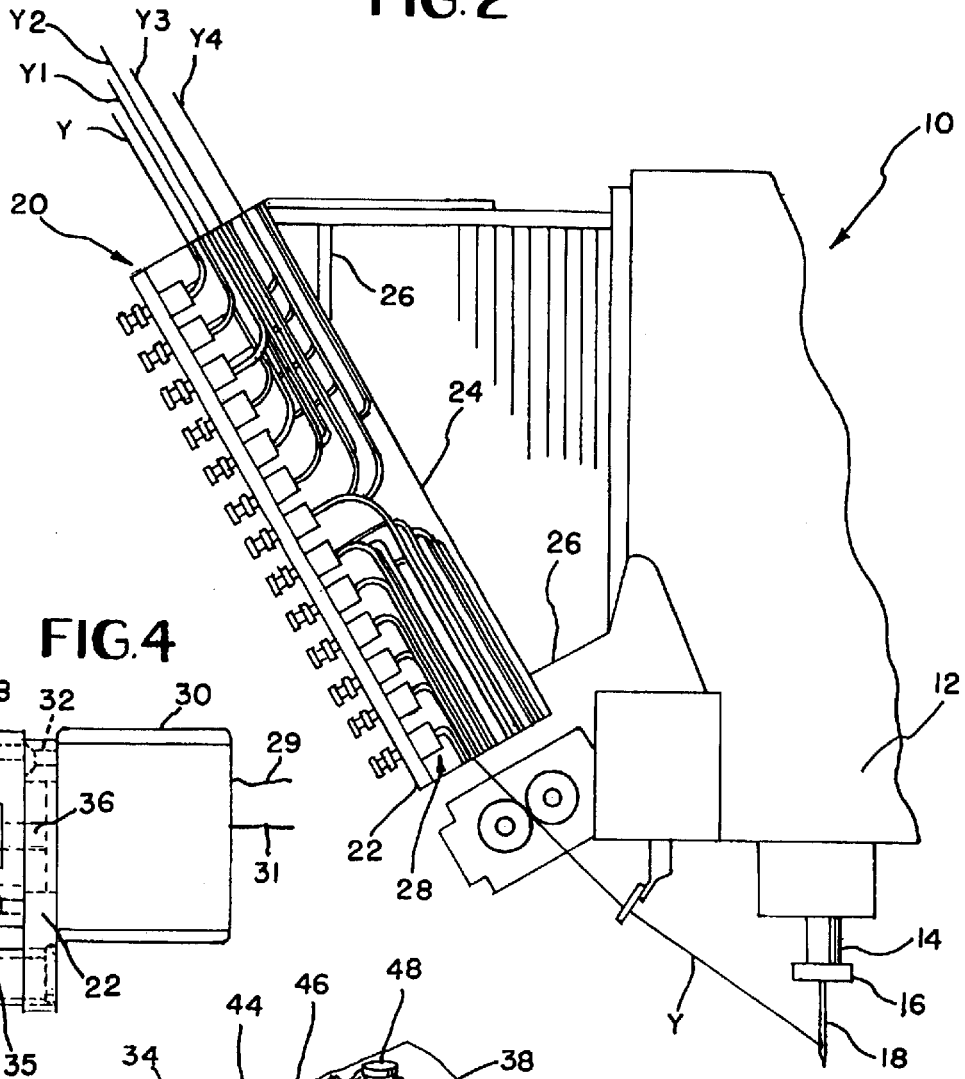
FIG. 4
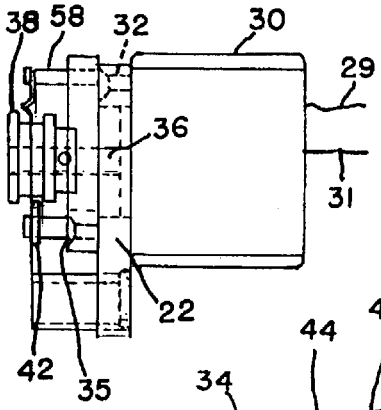
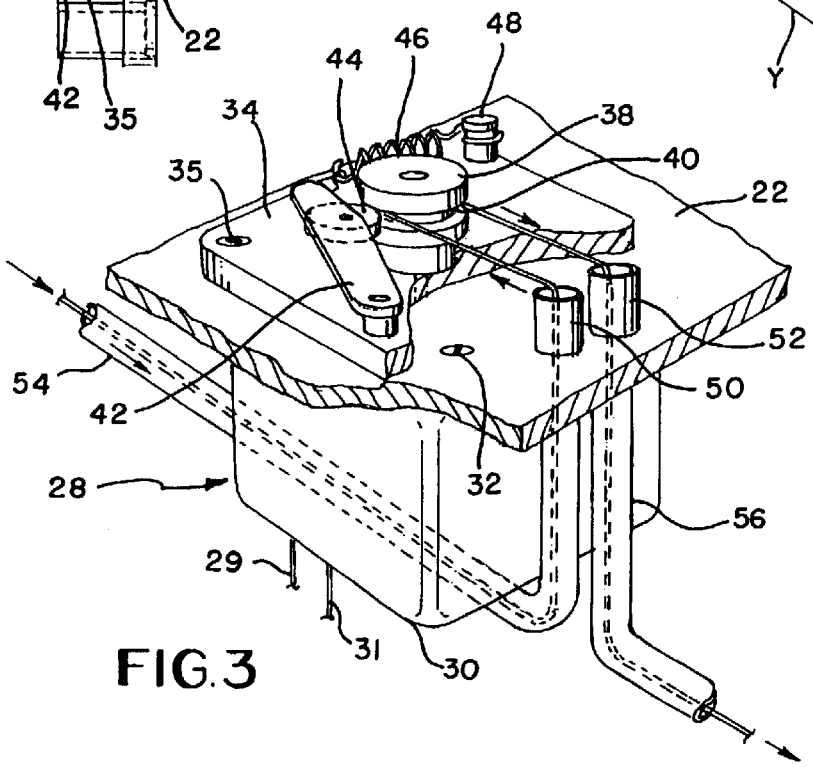
FIG. 3

TUFTING MACHINE YARN FEED PATTERN CONTROL

Matter enclosed in heavy brackets [ ] appears in the original patent but forms no part of this reissue specification; matter printed in italics indicates the additions made by reissue.

This invention relates to tufting machines and more particularly to a yarn feed pattern control for a tufting machine having a separate feed motor for each individual yarn end fed to the tufting machine for varying the pile height of each tuft selectively, thereby permitting a full repeat across the full width of the tufting machine.

It is well known in the carpet tufting art to utilize a yarn feed roller attachment for producing variations in pile height of loop pile products, and for producing cut and loop products wherein any particular needle may produce either a loop pile tuft or a cut pile tuft. The yarn feed rollers act either to feed the full amount of yarn to adequately accommodate the yarn requirements of the particular needle or to feed less than that adequate amount of yarn so as to backdraw or backrob yarn from the previous stitch. The backrobbing features are adequately described in the prior art, for example, U.S. Pat. No. 2,862,465 in regard to loop pile and U.S. Pat. No. 3,084,645 in regard to cut and loop products.

As described in U.S. Pat. No. 5,182,997, each needle in the tufting machine may be controlled individually to either produce a high loop or a low loop by feeding yarn to each of the respective needles at a first or a second speed, the first and second speeds being different. The greater quantity of yarn fed at the highest speed provides an adequate amount of yarn for the needle while the slower speed supplies a lesser amount so as to backrob from the prior loop. The assembly there shown is known as a single end control yarn feed roller assembly or a full repeat scroll and is a two pile height feed roller assembly. There are other feed roller assemblies of this type that may permit a third level to be formed by including an additional drive roll pair for driving the feed roll at a third speed intermediate the first and second speeds.

Recently, with the improvements made in the art of servo motors wherein such motors have been made smaller and quick acting, it is now possible to drive a single yarn end by a respective servo motor to each individual needle. This provides the ability to feed each yam at a multitude of speeds to each needle so that a substantial number of pile heights may be produced by each individual needle. This gives the carpet designer a substantially greater arsenal of design capabilities than heretofore possible. For example, certain needles may be threaded with different color yarns and a particular color yam may be hidden it the carpet at a first location and yet show slightly at a different location in the direction the carpet is being fed, and show up even more at still other locations so that various shading effects may be created. Additionally, different effects may be created in cut and loop carpets of the type manufactured using the method disclosed in U.S. Pat. No. 3,084,645 and in level cut and loop carpet such as the type produced using the method illustrated in U.S. Pat. No. 4,185,569.

When one considers that a full sized tufting machine such as a 4 meter or a 15 foot machine having a ⅛ gauge, i.e., ⅛ inch between rows of needles, may have as many as approximately 1298 needles such that multi-level single end control of the yam being fed would require approximately 1298 servo motors, it can be seen that there is a massive number of yarn ends being fed to the needles and that some means must be found to mount the motors and direct the yarns for threading the proper needle or the massive number of yarns would be intermingled or interwinded and concatenated and make it extremely difficult for threading the needles. If a particular yarn does not go to the proper needle, the pattern would be defective which may result in wasted fabric.

SUMMARY OF THE INVENTION

Consequently, it is a primary object of the present invention to provide a yarn feed pattern assembly for a tufting machine that permits full control of the pattern repeat across the width of the tufting machine permitting each needle to receive a respective yarn fed at a multiplicity of speeds selectively.

It is another object of the present invention to provide a yarn feed pattern assembly for a tufting machine having an individual motor drive assembly for each needle to permit feeding of the yarn at different selective rates to each respective tive needle of the tufting machine.

It is a future object of the present invention to provide a yarn feed roller pattern assembly for attachment to a tufting machine, the assembly having an individual motor drive assembly for each needle and having a yarn guide system for guiding a yarn to and from each respective motor drive assembly.

Accordingly, the present invention provides a tufting machine having a yarn feed pattern assembly including a housing having a mounting plate for mounting a multiplicity of servo motors, each servo motor preferably corresponding to one needle in the tufting machine so that a full repeat pattern across the width of the tufting machine may be provided. Each servo motor carries a roller about which yarn is trained so as to be fed from a yarn source to the respective needle, the motor being mounted on one surface of the mounting plate and the roller being mounted on the other. Within the housing leading to and from each roller is a respective input and output tube, and the input tubes supplying yarn from the yarn source to the receptive roller and the output tubes feeding yarn from the rollers to the respective needles. By maintaining the yarn in the housing within the guide tubes, the yarn is precluded from being entangled with other yarns and provides the machine operator with the ability to thread each particular needle with the correct yarn. For example, any particular servo motor may carry a particular number and the tubes extending thereto and therefrom may also be numbered to correspond with a particular needle. In this manner, the needles may be threaded correctly to provide the desired pattern.

The housing which carries the servo motors and rollers and in which the multitude of yarn guide tubes are mounted may be readily mounted as an attachment, so to speak, on the head of the tufting machine and the yarns fed to the machine may be directed to the needles from the housing conventionally.

BRIEF DESCRIPTION OF THE DRAWINGS

The particular features and advantages of the invention as well as other objects will become apparent from the following description taken in connection with the accompanying drawings in which:

FIG. 2 is a fragmentary side elevational view of the machine illustrated in FIG. 1 with the end of the yarn feed pattern attachment housing removed;

FIG. 3 is a perspective view of a portion of the mounting plate of the yarn feed pattern attachment broken away and rotated relative to FIG. 2 to illustrate the servo motor and yarn drive associated therewith; and FIG. 4 is a cross-sectional view taken substantially through line 4-4 of FIG. 1 at a greatly enlarged scale.

DESCRIPTION OF THE PREFERRED EMBODIMENT

Figure 1:
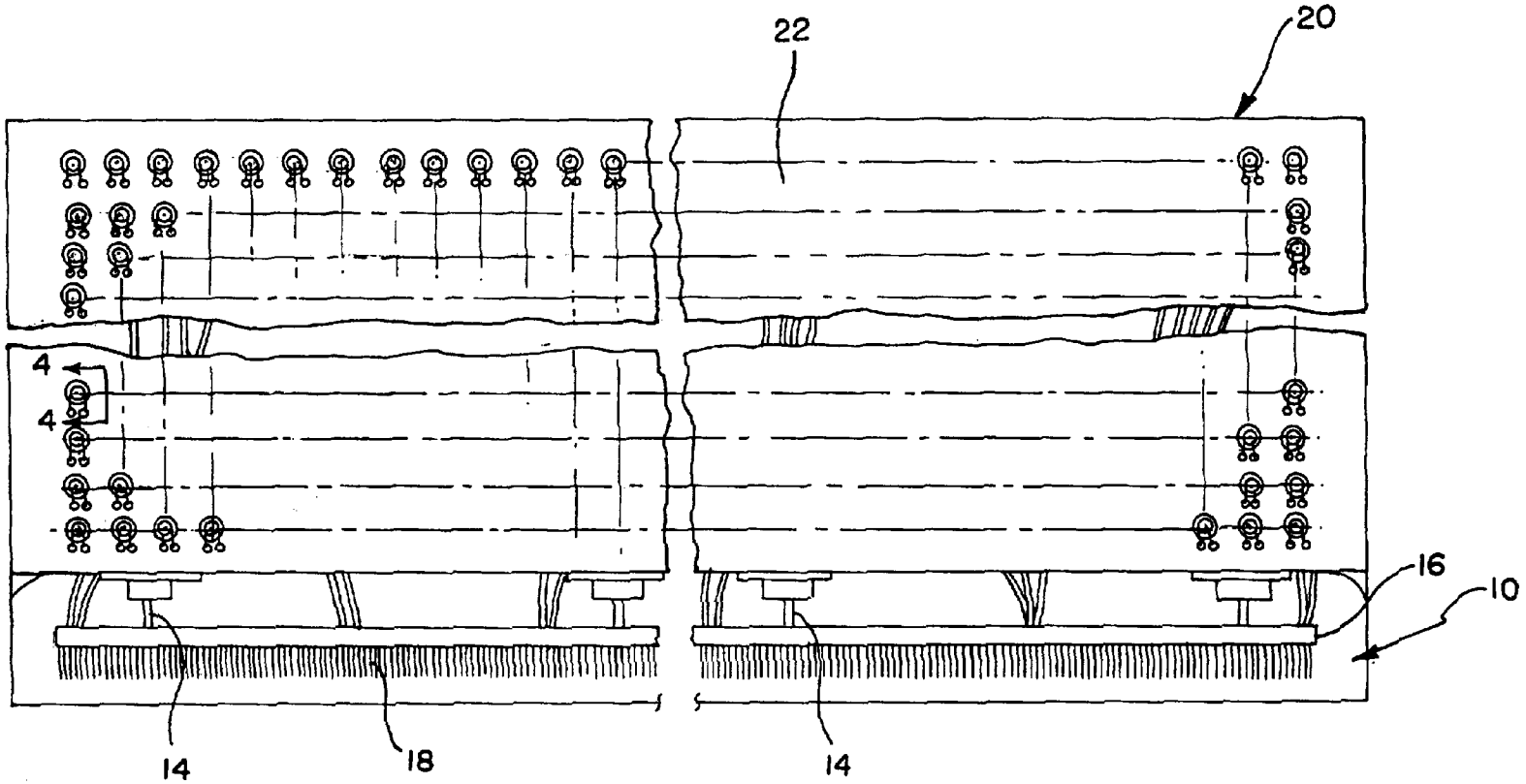
FIG. 1 is a front elevational view of a tufting machine incorporating a yarn feed pattern attachment constructed in accordance with the principles of the present invention.

Referring to the drawings, FIGS. 1 and 2 illustrate a tufting machine 10 having a head 12 in which a plurality of transversely spaced push rods 14 is reciprocally mounted, the push rods carrying a needle bar 16 at the lower ends thereof. The needle bar 16 carries a multiplicity of needles 18, which may be mounted in a single roll as illustrated or in two rows which may or may not be staggered relative to each other as well known in the art. Moreover, rather than being a laterally fix needle bar, the needle bar 16 may be of the laterally shiftable types as is well known in the art. In any event, the needles cooperate with corresponding respective loopers and hooks (not illustrated) conventionally mounted beneath the head as is notoriously well known in the art.

Mounted as an attachment on the head of the tufting machine is a yarn feed roller pattern assembly 20 constructed in accordance with the present invention. Yarn, such as yarn strands Y, $Y_1$, $Y_2$, $Y_3$, $Y_4$, are supplied from a source such as a yarn creel (not illustrated) and are directed to the pattern attachment 20 and from the pattern attachment each yarn is directed to a respective separate needle 18.

The yarn feed roll pattern attachment 20 comprises a housing having a front face plate 22 spaced from a rear plate 24, the plates 22, 24 being connected together by end plates (not illustrated) so as to form a hollow housing having open upper and bottom portions. The rear plate 24 may be connected to the tufting machine by means of brackets 26 so that the yarn is readily available for threading to the multiplicity of needles.

Secured to and carried by the front face plate 22 are a multiplicity of yarn feed roll assemblies each including a respective servo motor 28, there preferably being one servo motor for each needle 18. As well known each servo motor may be controlled to rotate at variable selected speeds, and to this end electrical connectors 29,31 extend from the motors to a program controller (not illustrated). Each servo motor has an outer casing 30 which is connected by screws 32 or the like to the rear surface of the front face plate 22 while a yarn feed roller support plate 34 is connected by screws 35 to the front surface of the plate 22 in superposed relationship relatively to the servo motor. The output shaft 36 of the each servo motor extends through the front plate 22 and the support plate 34 and is connected to a roll 38, which, as illustrated, may have a pulley configuration. Thus the roller 38 may have a central circumferential recess within which a yarn may be trained. A lever yarm 42 has one end pivotally mounted on the plate 34 and carries a disk or small roller 44 which is disposed to fit within the recess 40, a coil spring 46 connected at one end to the lever 42 and at it other end to a post 48 on the plate 34 acting to bias the level toward the roller 38 so that the disk 44 may place friction on the yam that is within the recess 40.

Adjacent each plate 34 is a pair of apertures within which a receptive bushing 50, 52 is fastened. A first yam guide tube 54 preferably constructed from aluminum or plastic tubing is secured within each bushing 50 and is bent to extend upwardly toward and preferably beyond the top of the yarn fed roller assembly housing 20 while a similar tube 56 is secured within each busing 52 and is bent to extend downwardly to adjacent the lower end of the housing 20. A yarn end may thus be threaded into each tube 54 at the top, fed out the bushing 50, about the pulley 38, through the bushing 52, through the corresponding tube 56 and thereafter directed to the receptive needle 18.

Each servo motor is rotatably driven at a selected variable speed to feed the respective yarn to the needle, the faster the motor is driven, the faster the roller 38 is rotated and the greater the amount of yarn fed to that needle. If the amount of yarn fed is less than the amount required by the needle system during its reciprocating path, then yarn is backrobvbed from the prior stitch to form a shorter loop in that prior stitch. The various speeds that the servo motor may be driven results in variations in the pile heights in the various stitches so that numerous patterns may be formed. Of course, as khown in the art, the control to the servo motors may be by means of a conventional programmer or computer which is programmed with the desired pattern so that on each stitch the required amount of yarn is fed to each particular needle. Accordingly, a full repeat or single end control may be readily provided by the present invention in a simple manner.

Thus, the present invention provides a yarn feed roller assembly having a housing wherein the servo motors may be mounted on a plate of the housing and yarn guide tubes may be carried within the housing for guiding yarn to and from a yarn feed member driven by the servo motor. The yarn feed rolled assembly thus insures that the correct yarn is fed to and from each particular servo motor controlled yarn feed member.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed therein is:

1. A yarn feed roller assembly for a tufting machine comprising a hollow housing having a mounting plate, a multiplicity of drive rollers rotatably mounted on said mounting plate, a multiplicity of variable speed motors mounted on said mounting plate, each motor having an output shaft connected to one of said rollers, and a multiplicity of yarn guide tubes mounted within said housing, there being [two] *a first* guide tube[s] associated with each roller, [one] for directing yarn from a source to the roller [and the other for directing yarn from the roller to the tufting machine], *and a guide having an aperture through which said yarn is directed from the roller to the tufting machine*.

2. A yarn feed roller assembly as recited in claim 1, wherein said mounting plate comprises an exterior wall of said housing and includes an exterior surface and an interior surface, said rollers extending from the exterior surface and said motors extending from said interior surface.

3. A yarn feed roller assembly as recited in claim 1, including a member for frictionally engaging each roller to apply a frictional force to yarn trained about said roller.

4. A yam feed roller assembly as recited in claim 1, wherein said tufting machine includes a head and brackets for attaching said housing to said head.

5. A yarn feed roller assembly as recited in claim [1]*6*, wherein said housing is open at an upper end and a lower end, said *first* guide tubes associated with said roller for directing yam from a source to the roller extend from said upper end and the *second* guide tubes associated with each roller for directing yarn from the rollers to the tufting machine extend to said lower end of said housing.

*6. The yarn feed roller assembly as recited in claim 1 wherein the guide roller comprises a second guide tube associated with each roller for directing yarn from the roller to the tufting machine.*

*7. A yam feed roller assembly for a tufting machine comprising a hollow housing having a mounting plate, a multiplicity of drive rollers rotatably mounted on said mounting plate, a multiplicity of variable speed motors mounted on said mounting plate, each motor having an output shaft connected to one of said rollers, and a multiplicity of yarn guide tubes mounted within said housing, there being a first guide tube associated with each roller, for directing yarn from a source to the roller, said yarn then directed from the roller to the tufting machine.*

* * * * *